June 7, 1932.   H. F. PARKER   1,862,278
BRAKE ADJUSTER
Filed May 17, 1930

INVENTOR.
HUMPHREY F. PARKER
BY
ATTORNEY

Patented June 7, 1932

1,862,278

UNITED STATES PATENT OFFICE

HUMPHREY F. PARKER, OF SOUTH BEND, INDIANA, ASSIGNOR TO BENDIX BRAKE COMPANY, OF SOUTH BEND, INDIANA, A CORPORATION OF ILLINOIS

BRAKE ADJUSTER

Application filed May 17, 1930. Serial No. 453,388.

This invention relates to brakes, and more particularly to internal expanding brakes.

An important problem in brake structure is the provision of a simple and inexpensive adjustment means for the braking elements. Due to wear imposed on these elements, they necessitate frequent adjustment, to compensate for such wear, hence a means for adjusting the braking elements readily accessible from outside the brake is highly desirable.

An object of the invention is to provide a means for adjusting the relative position between the primary and secondary braking elements.

Another object of the invention is to provide an adjustment between the braking elements which may be readily accessible from outside of the brake.

A further object of the invention is to provide an adjustment between the braking elements which has the advantages of a positive adjustment, is highly efficient in operation and yet of marked simplicity as a whole and in respect to its component parts, so that its manufacture may be economically facilitated both as regards to parts and their assembly.

Further objects and advantages of the invention reside in the various combinations hereinafter described and claimed, as will be apparent upon reference to the following specifications and to the accompanying drawing, in which:

Figure 1:
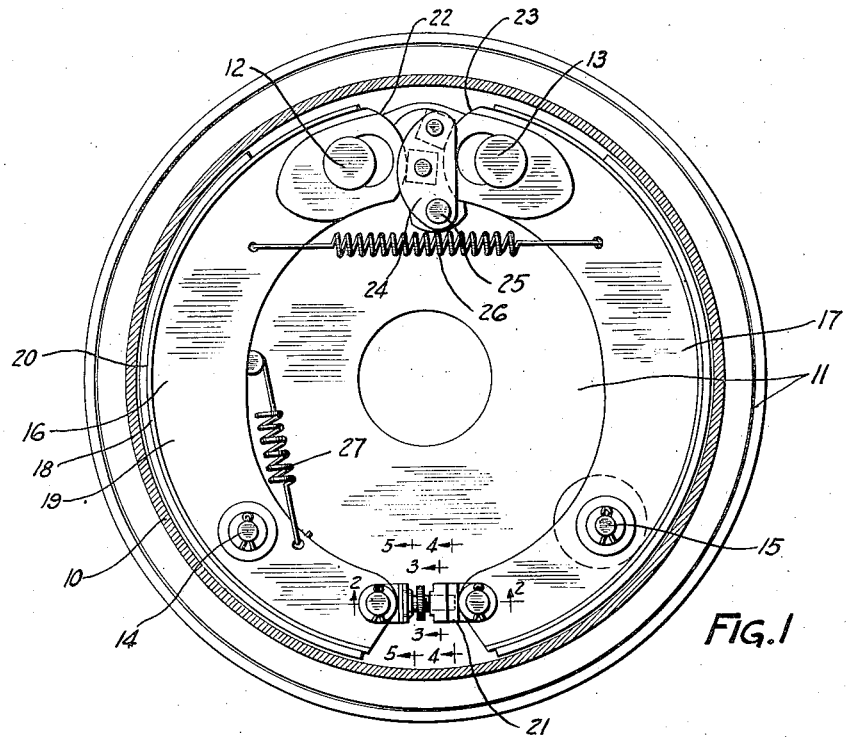
Figure 1 is the side elevation of a brake embodying the invention.
Figures 2, 3:
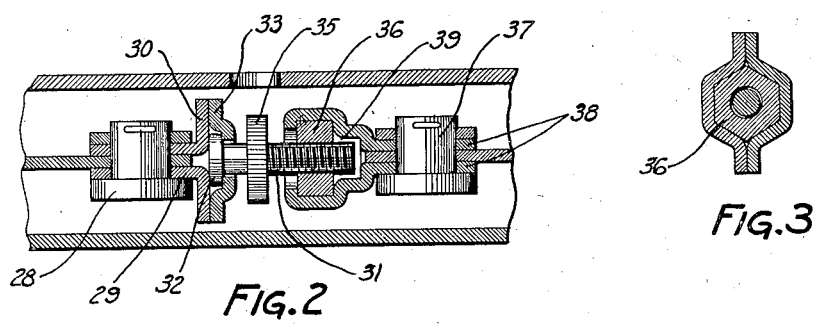
Figure 2 is a sectional view substantially on line 2—2, Figure 1.
Figure 3 is a sectional view substantially on line 3—3, Figure 1.
Figures 4, 5:
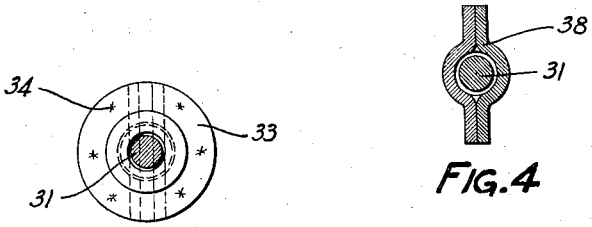
Figure 4 is a sectional view substantially on line 4—4, Figure 1.
Figure 5 is a sectional view substantially on line 5—5, Figure 1.

In the embodiment illustrated, there is provided a conventional drum 10 at the open side of which is a stationary support such as a backing plate 11. Positioned on the backing plate are anchor pins 12 and 13 and steady rests 14 and 15. Movably mounted on the anchor pin 12 and steady rest 14 is a primary shoe 16 and positioned on the anchor pin 13 and steady rest 15 is a secondary shoe 17. These shoes are of a conventional type and may comprise a rim 18 and a web 19 with a suitable lining 20 secured to the rim.

The shoes are connected at their articulating ends by an adjusting device represented generally at 21 and the other ends of the shoe are provided with suitable shoulders 22 and 23 between which is positioned a suitable cam 24, adapted to be actuated through an operating means 25, and the shoes are connected by return springs 26 and 27.

The articulating ends of the shoe 16 have positioned therein, a stud 28. This stud supports plates 29 fitted on each side of the web of the shoe, and the plates 29 have flanges 30. A screw 31 is mounted for rotation on the flanges 30. As shown, the screw is provided with a head 32 secured in position on the flanges 30 by a suitable washer 33 spot welded to the flanges 30 as indicated at 34.

The screw 31 is provided with a thumb nut 35 for rotation thereof and has positioned thereon for travel a nut 36. Positioned in the articulating end of the shoe 17 is a stud 37 supporting two corresponding plates 38 on the web of the shoe. The numbers 38 are each stamped with a recess 39 so that when assembled they will provide a suitable housing for the nut 36 which fits snugly therein and is secured against rotation by the engagement of the faces on the nut with the faces formed with the recess 39.

Upon rotating the screw 31 through the thumb nut 35, the nut 36 will travel on the threaded portion of the screw 31 and move the articulating ends of the shoes toward or away from each other, so that a suitable adjustment may be obtained to provide a proper clearance between the shoes and the drum. In order to facilitate a ready adjustment of the device, there is provided in the backing plate, a suitable opening through which the thumb nut may be readily reached for manipulation.

Although this invention has been described in connection with certain specific embodiments, the principles involved are susceptible of numerous other applications that will readily occur to persons skilled in the art. The invention is, therefore, to be limited only as indicated by the scope of the appended claims.

Having thus described the various features of the invention, what I claim as new and desire to secure by Letters Patent is:

1. A brake comprising a plurality of braking elements, a screw mounted for rotation on one of the braking elements and a member secured against rotation on another braking element adapted to travel on the screw.

2. A brake comprising a plurality of braking elements, a screw mounted for rotation on one of the braking elements, means for rotating the screw and a member secured against rotation on another braking element adapted to travel on the screw.

3. A brake comprising a plurality of braking elements, a screw pivotally secured to one of the braking elements and adapted to rotate thereon, means for rotating the screw and a member pivotally secured to another braking element and held against rotation adapted to travel on the screw.

4. A brake comprising a plurality of braking elements, a threaded member pivotally secured on one of the braking elements and adapted for rotation thereon, a member pivotally secured to another braking element and held against rotation adapted to travel on the threaded member and means for rotating the threaded member.

5. A brake comprising two shoes, a screw pivotally and rotatably mounted on one of the shoes and a member adapted to travel on the screw secured against rotation and pivotally supported on the other shoe.

6. A brake comprising a plurality of braking elements, a member pivoted to one of the elements, a screw having a head supported for rotation on the member, a member pivoted to the other element having a recess and a member seated in the recess adapted for travel on the screw.

7. A brake comprising a plurality of braking elements, a member pivoted to one of the elements, a screw having a head supported for rotation on the member, means for rotating the screw, a member pivoted on the other element having a recess and a member confined in the recess adapted for travel on the screw.

8. A brake comprising a plurality of braking elements, a member pivoted to one of the elements, a screw having a head supported for rotation on the member, means for confining the screw against displacement, means for rotating the screw, a member pivoted on the other element having a recess and a member positioned for travel on the screw confined within the recess.

In testimony whereof, I have hereunto signed my name.

HUMPHREY F. PARKER.